Dec. 23, 1952   B. P. J. VAN BERKEL   2,623,172
APPARATUS FOR ACTUATING AN ALARM CIRCUIT
Filed May 28, 1947   3 Sheets-Sheet 2

INVENTOR:
BERNARDUS P. J. VAN BERKEL
BY:

Dec. 23, 1952     B. P. J. VAN BERKEL     2,623,172
APPARATUS FOR ACTUATING AN ALARM CIRCUIT
Filed May 28, 1947     3 Sheets-Sheet 3

Patented Dec. 23, 1952

2,623,172

UNITED STATES PATENT OFFICE 2,623,172

APPARATUS FOR ACTUATING AN ALARM CIRCUIT

Bernardus P. J. van Berkel, Zwolle, Netherlands

Application May 28, 1947, Serial No. 751,052
In the Netherlands June 5, 1946

14 Claims. (Cl. 250—27)

The invention relates to a device which closes an alarm circuit when a radio receiver receives a distress signal of an international standard consisting of dashes the duration of which lies between a predetermined maximum and minimum.

It is known in the art to provide devices with a circuit reacting when the dash lasts longer than a predetermined maximum duration, a second circuit reacting when the dash does not exceed a predetermined maximum duration, and a third circuit to check whether the interspace does not exceed a predetermined maximum duration. Furthermore, it is known to provide an arrangement including a relay to count the number of dashes of the correct length. The condensers of these devices are charged through a normal resistance.

According to the invention, the device comprises a number of circuits each consisting of a series arrangement of a condenser and a resistance, the condenser being charged during the reception of the dashes and interspaces, respectively, a first circuit indicating when a predetermined charging voltage is reached that the dashes have a predetermined minimum duration, two other circuits indicating when a predetermined condenser charging voltage is reached that the dashes or interspaces, respectively, do not exceed a predetermined duration, a counting arrangement which closes the alarm circuit after reception of at least a predetermined number of dashes, and a relay inserted in the anode circuit of a tube whose control grid voltage is dependent on the condenser voltage so that a check is obtained on the attainment of a predetermined voltage on the condensers.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
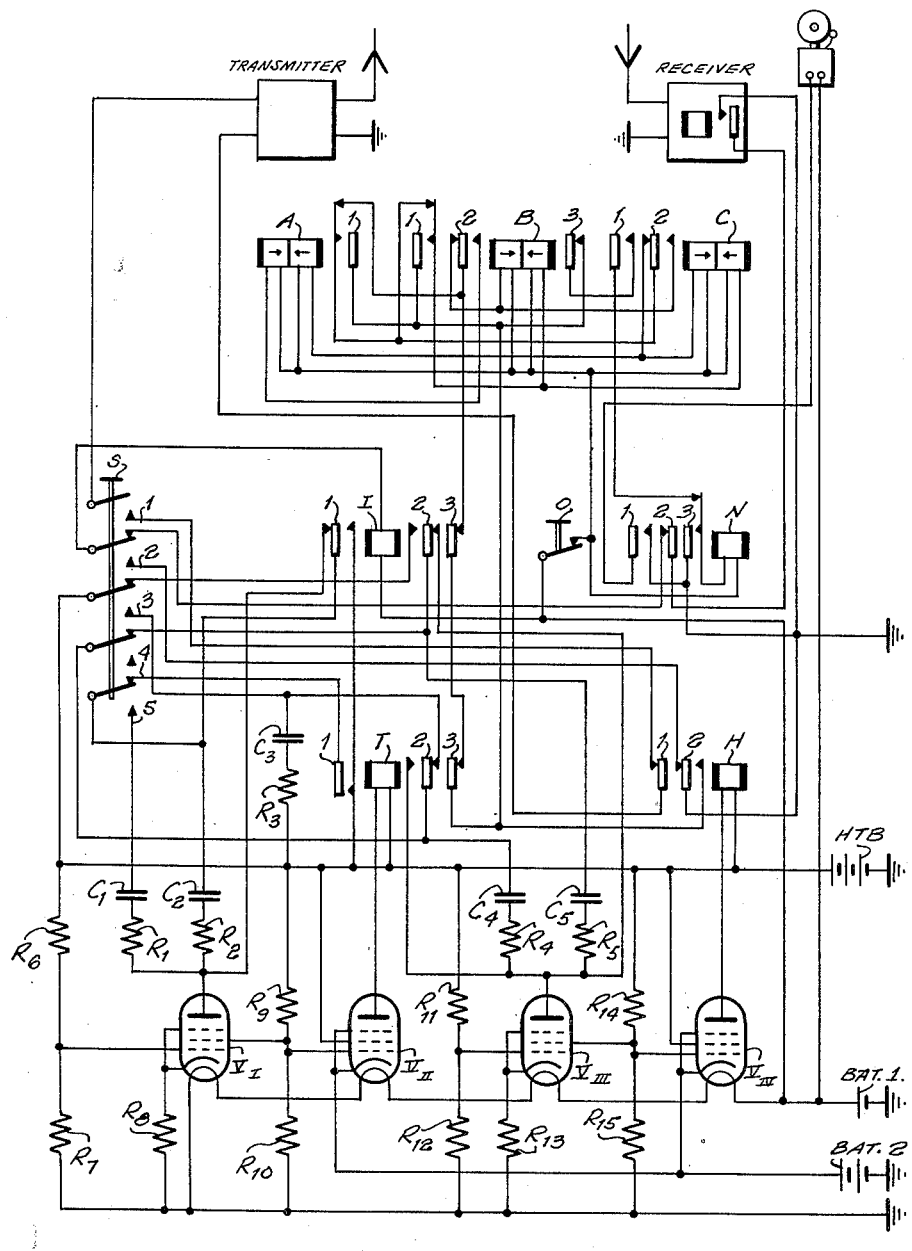
Fig. 1 is a wiring diagram of the apparatus according to the invention.

Referring now to the drawings, and first to Fig. 1, the apparatus consists of an input circuit, an alarm output circuit, a distress signals output circuit, a time checking circuit, and a register.

The time checking and the distress signal recording arrangement which is shown in Fig. 1 is connected to a radio receiver which is only indicated in order to show the input of the arrangement. The receiver receives by means of the antenna thereof signals on a certain radio frequency and operates a relay which is shown in the rectangle representing the receiver. The contact of said relay is on the one side connected to ground and on the other side over contact 2 of relay N and contact 2 of switch S to an input relay I which serves for applying the received signals to a time checking arrangement.

The input relay I applies the received signals to the time checking arrangement by means of the contacts 1 and 2 thereof which are adapted to interrupt the anode circuits of the tubes $V_I$ and $V_{III}$, respectively, upon energization of relay I. The flow of anode current in tube $V_I$ will only slightly decrease after the anode circuit is interrupted at contact 1 of relay I as a condenser $C_2$ is provided in shunt to contact 1 of relay I and will be charged then. The control grids of the tubes $V_I$ and $V_{III}$ are set on predetermined potential values by means of potentiometers $R_6/R_7$ and $R_{11}/R_{12}$, respectively. The screen grids of the tubes $V_{II}$ and $V_{III}$ are connected to the control grids of tubes $V_{II}$ and $V_{IV}$, respectively. The invention makes use of the fact that the screen grid circuit may be considered as a secondary anode circuit, i. e. that the screen grid current increases when the anode current falls. The screen grid current will then result in a higher number of electrons on the control grids of tubes $V_{II}$ and $V_{IV}$ so that the tubes $V_{II}$ and $V_{IV}$ will be rendered non-conductive.

A relay T is provided in the anode circuit of tube $V_{II}$ and a relay R in the anode circuit of the tube $V_{IV}$. The relays T and H are energized when the tubes $V_{II}$ and $V_{IV}$, respectively, are conductive. But as it is possible to render the tube $V_{II}$ non-conductive by interrupting the anode circuit of tube $V_I$, relay T will be de-energized after a time dependent on the properties of the anode circuit of tube $V_I$. The screen grids of tubes $V_I$ and $V_{III}$ are provided with a back circuit to the positive battery terminal; according to the invention, however, potentiometers $R_9/R_{10}$ and $R_{14}/R_{15}$ are provided which has the advantage that when the tube $V_I$ or $V_{III}$ is conductive the tube $V_{II}$ or $V_{IV}$ will obtain a constant control voltage.

The anode circuit of tube $V_{III}$ is provided with two condensers $C_4$ and $C_5$ the use of which will be explained hereinafter with reference to the operation of the system.

The arrangement is furthermore provided with a register for recording the number in a series of correct dashes and interspaces. This register comprises three relays A, B and C which have each two coils wound differentially. The register is controlled by contact 3 of relay I, 2 of relay R and 3 of relay T and operates an alarm by means of a relay N which is energized after a series of three correct dashes followed by three interspaces according to the requirements.

Contact 2 of relay H has to be closed in order to operate the register so that for a correct distress signal relay H must remain energized.

The registering relays A, B and C and the alarm relay N are connected over the contact of switch O to a battery Bat I, no matter in whatever combination the relays A, B and C are energized. The switch O which may be a normal restoring key is adapted to release the register and the alarm relay N, so that when the contact of the switch O is opened the relays A, B, C and N are forced to release.

Relay N operates the alarm by contact I of said relay, whereas contact 2 is provided for interrupting the input of the arrangement.

The arrangement is furthermore provided with a switch or key S having contacts 1-5 and adapted to convert the arrangement from a receiving unit into a transmitter for distress signals. Contact I of the switch S closes a circuit for the transmitter, said contact being in series with contact I of relay H which serves for transmitting dashes and interspaces in this case. Contact 2 of the switch S serves for interrupting the connection between the arrangement and the radio receiver and connecting the input relay I to the front contact 2 of relay H so that relay I is then controlled by relay H. The contacts 3, 4 and 5 of switch S are provided for disconnecting condensers $C_4$ and $C_5$, respectively, in the anode circuit of tube $V_{III}$ and to insert the condenser $C_1$ in the anode circuit of tube $V_I$.

The batteries HTB, Bat 2 and Bat I may have voltages of 120 volts, 24 volts and 60 volts, respectively.

Distress signals consist of dashes of four seconds' duration and one second's interspace. If a dash or an interspace lasts a little longer or less than usual, the character of the signals is nevertheless maintained, provided that they satisfy the following conditions:

A dash must last at least three seconds and at most five seconds; an interspace must not last more than two seconds.

Figure 4:
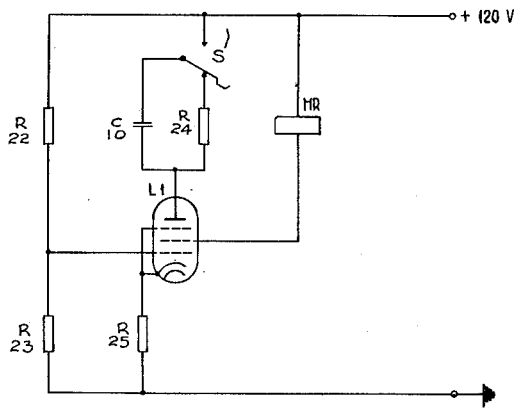
Fig. 4 illustrates a simplified time checking device.

For checking these times, the charging time of a condenser is made use of as will be more fully explained with reference to Fig. 4 which represents a pentode LI corresponding to the tube $V_I$ or $V_{III}$ shown in Fig. 1. The pentode LI has a control grid connected to a potentiometer $R_{22}/R_{23}$ across which a potential difference of 120 volts is maintained. The anode circuit of the tube LI is provided with a condenser $C_{10}$ and a resistor $R_{24}$. A contact S' is provided in order to allow the condenser $C_{10}$ to be charged and discharged. The cathode circuit is provided with a resistor $R_{25}$ which limits the current to the tube and thus the charging current of the condenser $C_{10}$. When the condenser $C_{10}$ is charged the screen grid current of the pentode LI increases so that the resistance HR in the screen grid circuit carries a stronger current.

The pentode LI of large constant mutual conductance has a cathode resistor $R_{25}$ of such an order of magnitude that the cathode voltage is equal to the control voltage when the cathode current is at least 100 ma. With an applied voltage of e. g. 120 volts and a control voltage of 20 volts, the latter will be obtained by the resistors $R_{22}$ and $R_{23}$ if $R_{22}$ is five times as large as $R_{23}$. The control grid operates when the voltage drop across the cathode resistor exceeds 20 volts. As far as the control grid and the cathode are concerned, the arrangement operates as stabilizer. The stability will increase in proportion as the control voltage is higher and the grid swing smaller. In the diagram shown, the control voltage is practically fourteen times as large as the grid swing. Therefore, the time check will be influenced only slightly when the quality of the applied tube decreases. With a decrease of 50%, the time check will be modified only by 3.5%. Therefore, practically 100 volts are left at the anode if the condenser is not charged and the switch S is switched in. With this stabilized cathode current the screen grid voltage is given the value of 60 volts, which will be taken by the resistance of HR. Afterwards it will appear how this is realized in practice.

Figure 5:
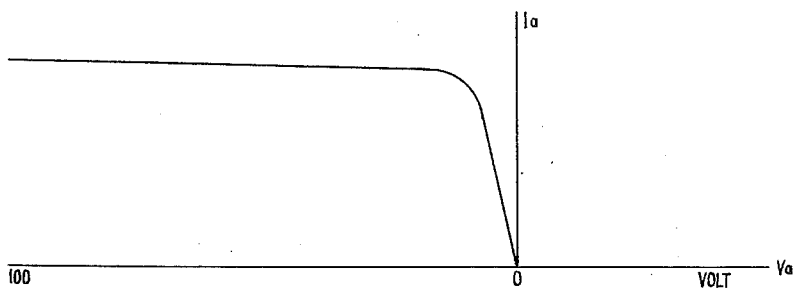
Figs. 5 and 6 are diagrams illustrating the operation of the device shown in Fig. 4.
Figure 6:
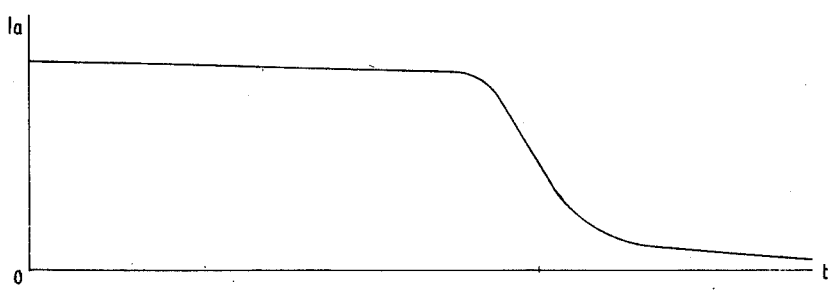

The characteristic of the pentode anode is used for the time check; this characteristic has been represented in Fig. 5. A condenser $C_{10}$ is charged by the anode current, the anode voltage decreasing as a function of the load of the condenser. This load is increasing with a speed proportional to the capacity of the anode current. The graph of the anode current against the charging time has been represented in Fig. 6.

The screen grid current increases with decreasing anode current since practically the cathode current remains constant. This increase of the screen grid current is an indication for the period of time to be measured. It is a peculiarity of this arrangement that a very accurate measurement is made independent of voltage variations and of the quality of the pentode.

To transmit the variations of the screen grid current, the resistor HR in the screen grid circuit might be of the relay type so that a relay HR indicates the variations by means of the energized condition thereof. But it is practically impossible to operate such a sensitive relay. For this reason, a second tube has been inserted in each unit, as shown in Fig. 1. In the arrangement according to Fig. 1 the screen grid voltage of the tubes $V_I$ and $V_{III}$ which have the same function as the tube LI in Fig. 4, is fixed at 60 volts by the resistances $R_9$ and $R_{10}$, $R_{14}$ and $R_{15}$, respectively, so that the screen grid voltage decreases to 40 volts when a screen grid current flows. These variations of the screen grid voltages of the tubes $V_I$ and $V_{III}$ are transmitted to the grid of the auxiliary tubes $V_I$ and $V_{IV'}$ respectively, in the anode circuit of which relays T and H are provided, respectively, which react to the variations of the anode current of the auxiliary tubes. By adjusting the negative grid swing of the auxiliary tubes correctly, the reaction can be made to work very accurately as it is not influenced by the properties inherent to relays such as their great dependence on temperature and their mechanical deficiencies.

In the anode circuits of the tubes $V_I$ and $V_{III}$, resistances are arranged in series with the condensers. These resistances restrict the current to ±0.4 amp. when the condensers are discharged over the relay contacts. When the condensers are charged, a voltage drop of ±¼ volt occurs which does not deteriorate the time check. By changing the capacity of the condenser, the time to be measured can be changed for a given arrangement.

The anode circuits of the tubes $V_I$ and $V_{III}$ are developed into networks in which the time check can be carried out in accordance with the relevant requirements. The minimum duration of the dashes is checked by the properties of the cathode resistor $R_3$ and the condenser $C_2$ in the anode circuit of tube $V_I$ and slightly by the resistor $R_2$. According to the international standards the minimum time of a dash is three seconds so that the RC time has to be three seconds. This fixed minimum of the dashes is transferred by the contact 2 of relay I and contact 2 of relay T in the anode circuit of tube $V_{III}$. Furthermore, the maximum duration of the dashes and the maximum duration of the interspaces are checked in this circuit so that when the maxima are surpassed the reaction relay H will release its armature. The relevant procedure will be explained hereinafter.

The operation of the arrangement is as follows:
When a dash is received by the radio receiver, relay I is energized in the circuit Bat I, over relay I, contact 2 of switch S, contact 2 of relay N, the closed relay contact in the receiver to ground and let it be assumed now that immediately thereafter the relays T and H are energized. With the energization of relay H, the counting system consisting of the differential relays A, B and C is switched on by the contact 2 of the relay H. After three seconds, the relay T releases its armatures, as the condenser $C_2$ will then be charged over the circuit: ground, cathode resistor $R_3$, tube $V_I$, resistor $R_2$ to condenser $C_2$, whereas the other side of the condenser is connected over contact I of relay I and parallel thereto over contact 5 of switch S, and contact I of relay T to the battery HTB which is grounded, so that the screen grid voltage is reduced and tube $V_{II}$ cut off. If relay I becomes inoperative within two seconds after the relay T has released its armature, the counting system makes one step as in two seconds the condensers $C_4$ and $C_5$ will be charged in the circuit: ground, the cathode resistor $R_{13}$, tube $V_{III}$ over the parallel arranged resistor $R_4$ and $R_5$ to the condensers $C_4$ and $C_5$. The condenser $C_5$ is then connected on the other side over contact 2 of the input relay I and the condenser $C_4$ over contact 4 of switch S to said contact 2 of relay I, and contact 2 of switch S to the positive terminal of battery HTB.

Figure 2:
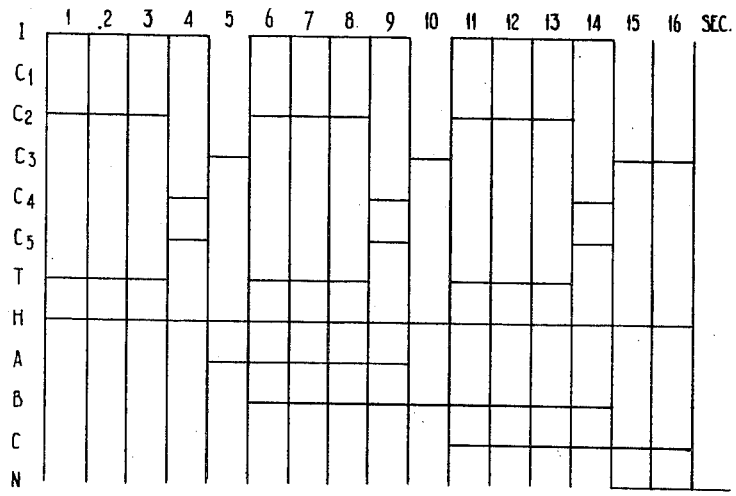
Figs. 2 and 3 are time diagrams.

Fig. 2 shows the succession in which the counting system operates if distress signals are received. During the reception of the first dash, no closed circuit over the relays A, B, C is established because contact 2 of relay I is open. At the end of the first dash, contact 3 of relay I returns to the indicated position (Fig. 1) and the following circuit is made: Ground, front contact 2 of relay H, back contact 3 of relay T, back contact 3 of relay I, and now in parallel back side of the make before break contact I of relay A and back contact 2 of relay B. From contact I of relay A the circuit branches into back contact I of relay B and 2 of relay C and from contact I of relay B to one coil of the differential relays B and C and from 2 of relay C to the first coil of the differential relay A and the second coil of relay C. From contact 2 of relay B, it leads to the second coil of relay B. Then the parallel circuits combine into back contact I of switch O and battery Bat I. The two coils of relay B and relay C are energized but the relays do not attract their armatures because the resulting magnetic field in each relay is zero. Relay A is operated because one coil is energized in the above circuit. Therefore, contact I of relay A, which makes the contact in the second position before breaking that in the first, is switched over so that only the second coil of relay B remains in series with the contacts 3 of relay T and 3 of relay I, so as to keep both the coils of relay B energized as long as this circuit exists.

At the beginning of the second dash, the second coil of relay B loses its energization so that the remaining energization in the first coil operates relay B. The make-before-break contact of relay B is switched over so that the first coils of relays B and C become independent of contact I of relay A. Contact 2 of relay B is switched over so that the second coil of relay A is under control by contacts 3 of relay T and 3 of relay I instead of the second coil of relay B so that the circuits for the register relays during the first interspace run as follows: from Bat I over contact I of switch O to contact 2 of relay H and to ground, between which contacts the first coils of relays A, B and C are energized and the second coil of relay C, so that both relays A and B are operated. The first coil of relay A is energized in the circuit extending from contact I of switch O over the coil of relay A, contact 2 of relay C, front of make before break contact I of relay A to contact 2 of relay H. The first coil of relay B is energized in the circuit from contact I of switch O over the first coil of relay B, front of make before break contact I of relay B and front contact 2 of relay H. The first coil of relay C is energized across the first coil of relay B, whereas the second coil of relay C is energized across the first coil of relay A. At the end of the second dash, the second coil of relay A is energized as relay I is released and the resulting field in relay A becomes zero so that it releases its armature. The following circuit is now made: battery Bat I, contact I of switch O, second coil of relay A, front contact 2 of relay B, back contact 3 of relay I, back contact 3 of relay T, front contact 2 of relay H to ground. Make-before-break contact I of relay A is switched back so that the second coil of relay A and the first coil of relay C come under the control by contacts 3 of relay T and 3 of relay I. The first and second coil of relay A are then controlled by contacts 3 of relay T and 3 of relay I and when energized will always supply a resulting magnetic field so that relay A remains in its normal position. The circuits between contacts 2 of relay H and I of switch O during the second interspace are the following: The first coil of relay A is energized in the circuit from contact I of switch O, over first coil of relay A, back contact 2 of relay C, back contact I of relay A, back contact 3 of relay I, back contact 3 of relay to front contact 2 of relay H. The second coil of relay A is energized in the circuit from contact I of switch O over the second coil of relay A, front contact 2 of relay B, back contact 3 of relay I, back contact 3 of relay T to front contact 2 of relay H. The first winding of relay B is energized in the circuit from contact I of switch O, the first coil of relay B, front of make before break contact I of said relay to contact 2 of relay H. The first coil of relay C is energized across the first coil of relay B whereas the second coil of relay C is energized across the first coil of relay A.

At the beginning of the third dash, the second coil of relay C loses its energization so that the remaining energization of the first coil of relay C operates relay C. Contact 2 of relay C is switched over so that the second coil of relay B instead of the first coil of relay A and the second coil of relay C is influenced by the contacts 3 of relay T and 3 of relay I. At the end of the third dash, relay B releases its armature because the second coil of relay B is energized and countermagnetizes the first coil of relay B so that the resulting magnetic field is zero. After the third correct dash is terminated and relay I de-energized the following circuits in the counting arrangement are formed: The second coil of relay A is energized in the circuit from contact 1 of switch O over the second coil of relay A, front contact 2 of relay B, back contact 3 of relay I, back contact 3 of relay T to front contact 2 of relay H. This circuit, however, lasts only for a few milliseconds as relay B is released as will be seen below. The first coil of relay B is still energized in the circuit from contact 1 of switch O, over the first coil of relay B, front of the make before break contact 1 of said relay to front contact 2 of relay H. The first coil of relay C is energized across said first coil of relay B. The second coil of relay B is energized in the circuit from contact 1 of switch O over the second coil of relay B, front contact 2 of relay C, back of make before break contact 1 of relay A, contact 3 of relay I, contact 3 of relay T to contact 2 of relay H. For a moment the three relays A, B and C will be operated, but as the energization of the second coil of relay B will persist independently of the operative conditions of relay A, the resulting magnetic field in relay B is zero so that relay B releases the armatures thereof. Upon the release of relay B the two coils of relay A will be de-energized leaving only relay C operated over its first coil.

A circuit is now closed for the alarm relay N extending from Bat 1 over contact 1 of switch O, relay N, make before break contact 3 of relay N, front contact 1 of relay C, back contact 3 of relay B, front contact 2 of relay H to ground. Relay N closes by means of its make before break contact 3 a holding circuit across contacts 1 of relay C, 3 of relay B, and 2 of relay H. By means of contact 2 of relay N the circuit for the alarm is closed, whereas contact 2 interrupts the connection between the receiver and the input relay I.

Fig. 2 shows the sequence of these operations. The three dashes take four seconds each and the three interspaces one second each. The charging of the condensers $C_1$ to $C_5$ and the operation of the relays I, T, H, A, B, C, and N is indicated in the diagram.

It now remains to be seen how the mutual cooperation between the timing devices and the register is realized upon reception of a signal and how a distress signal is determined.

The signals received by the radio receiver are transmitted to the input relay I of the arrangement according to the invention in the circuit mentioned above. Upon every received dash the input relay I is operated so that its armatures 1, 2 and 3 reach their front contacts, while at the end of a dash and thus the beginning of an interspace the armatures are released. Armature 3 controls the counting or registering arrangement consisting of relays A, B and C, whereas contact 1 of the relay I inserts the condenser $C_2$ in the anode circuit of tube $V_I$, said relay being operated.

It should be noted that it is immaterial which the starting condition of the relay T in the anode circuit of tube $V_{II}$ is, as the condenser $C_2$, which with the cathode resistor $R_8$ has an RC time equal to the required minimum duration of a dash in a distress signal, will not be charged as the condenser $C_4$ is short-circuited over the back contact 1 of relay I and the resistor $R_2$ of low resistance; when, however, the armature 1 of relay I reaches its front contact the condenser $C_2$ will be charged. During the charging of the condenser $C_2$ the tube $V_I$ will be conductive and the screen grid voltage will decrease, thus allowing the auxiliary tube $V_{II}$ to become conductive and relay T to be energized. Relay T will now be released when the condenser $C_2$ is charged, in other words when the screen grid voltage increases as explained above.

In the anode circuit of tube $V_{III}$ the relays T and I close a circuit path for the anode current from battery HTB over contact 3 of switch S, front contact 2 of relay I, contact 4 of switch S, contact 2 of relay T, anode to cathode in the tube $V_{III}$ and over the cathode resistor $R_{13}$ to ground, so that relay H in the anode circuit of the auxiliary tube $V_{IV}$ is energized for the same reasons as explained with reference to relay T and tube $V_{II}$.

A dash received by the radio receiver will now operate relay I which switches the condenser $C_2$ in the anode circuit of tube $V_I$ so that relay T is operated. There are now two possibilities, viz. (a) the dash has not the prescribed minimum length and (b) the dash is one of the minimum duration. In case (a), the condenser $C_2$ will not be charged and relay T is still operated; in case (b), however, condenser $C_2$ is charged so that relay T is de-energized due to the cut-off of the auxiliary tube $V_{II}$ as the screen grid voltage of tube $V_I$ equals or surpasses the cathode voltage of the tube $V_{II}$.

Thus when the dash does not have the minimum length the relay T remains energized so that upon release of relay I a direct circuit is completed for the anode current of tube $V_I$ which runs from battery HTB, over front contact 1 of relay T, contact 5 of switch S, back contact 1 of relay I, anode to cathode in tube $V_I$, cathode resistor $R_8$ to ground. This results in a constant energization of relay T. By means of front contact 2 of relay T the tube $V_{III}$ has a direct anode circuit to the battery HTB as explained above when the relay I is operated on a dash. When relay I is de-energized now, the anode circuit of tube $V_{III}$ is interrupted at contact 2 of relay I, so that the screen grid voltage will immediately increase and close tube $V_{IV}$, as the condensers $C_4$ and $C_5$ are short-circuited. Relay H will de-energize in such a case and at contact 2 interrupt all the existing parallel circuits of the counting or registering arrangement.

When the dash surpasses the minimum duration as mentioned in case (b) above, the relay T will be de-energized and thus interrupt the anode circuit of tube $V_I$ which is described above. By means of contact 2 of relay T the short circuit of the other side of the condensers $C_4$ and $C_5$ connected to the anode of tube $V_{III}$ is interrupted. When the dash is not yet terminated relay I will still be operated and armature 2 of said relay engage its front contact thus connecting the other side of the condensers $C_4$ and $C_5$ to the battery HTB and short-circuiting the condenser. The condensers $C_4$ and $C_5$ will now be charged which requires two seconds. There are again two possibilities: either the total dash lasts longer than three seconds which are required for releasing relay T and less than five seconds so that the condensers $C_4$ and $C_5$ will not entirely be charged or the total dash lasts longer than five seconds. In the first case the dash has to be recorded as one according to the requirements, which is performed by the engaging of the back contact 1 of relay I for stepping the counting arrangement to its next position which has been explained above. Under these circumstances the relay H is operated and the relays T and I are released. In the second case, however, the dash is not one according to the requirements and the register has to be restored to its original condition. In the second case the anode current will be reduced so much, as the condensers $C_4$ and $C_5$ are charged after two seconds, that the screen grid voltage of tube $V_{III}$ will increase and surpass the cathode voltage of the tube $V_{IV}$ so that the latter tube is cut off as the screen grid of tube $V_{III}$ is connected to the control grid of tube $V_{IV}$. Relay H will be released accordingly, thus interrupting all the parallel circuits of the counting arrangement as explained above.

The reception of an interspace is signified by a not operated relay I which will be evident from the foregoing. There are again two possibilities (a) relay T is not operated and (b) relay T is operated. In case (a), the shown position of contact 1 of relay T signifying an interspace has the following effect on tube $V_I$: as the condenser $C_2$ is short-circuited there will be no anode current and the screen grid voltage will be of such a value that tube $V_{II}$ remains non-conductive. In the anode circuit of tube $V_{III}$ the condenser $C_3$ will be charged, the circuit extending from ground over cathode resistor $R_{13}$, tube $V_{III}$, back contact of the make before break contact device 2 of relay I, contact 4 of switch S, back contact 2 of relay T to condenser $C_3$. The other side of said condenser $C_3$ is connected to battery HTB over resistor $R_3$. The condenser $C_3$ has a charging time together with the resistor $R_{13}$ which is equivalent to the maximum duration of an interspace, thus two seconds. If, however, the interspace surpasses this time limit, the anode current of tube $V_{III}$ will cease and owing to the increased screen voltage which is transferred to the grid of tube $V_{IV}$ said last tube will be rendered non-conductive, thus releasing relay H with the above explained results.

In case (b), when relay T is operated the case is encountered in which the dash did not meet the prescribed minimum duration which has been explained above.

The correct signals are thus received and checked as follows: the minimum duration of a dash is checked as a condenser charge on condenser $C_2$, whereas the fact that a dash does not surpass the maximum time limit is checked on the condensers $C_4$ and $C_5$ which are charged during the tolerance of two seconds; the maximum interspace is checked by the charging time of condenser $C_3$.

The discharging of the condensers takes place as apparent from the arrangement in which $C_2$ is discharged when contact 1 of relay I is in the shown position as then a short-circuit exists over resistor $R_2$; $C_4$ and $C_5$ are discharged when armature 2 of relay T reaches its front contact or/and contact 2 of relay I is in the shown position; whereas condenser $C_3$ is discharged during the maximum check of a dash in the short-circuit: condenser $C_3$, resistor $R_3$, contact 3 of switch S, front contact 2 of relay I, contact 4 of switch S, back contact 2 of relay T to condenser $C_3$.

During the reception of the signals, the counting arrangement counts under the control of front contact 3 of relay I until after the third dash relay B is inoperative and relay C operative. Relay N is operated over back contact 3 of relay B and front contact 1 of relay C, the make-before-break contact 3 of relay N connecting this relay to the battery Bat 1. The alarm is then operated in the circuit from Bat 1, over the alarm, contact 1 of relay N to ground.

After two seconds, relay H releases its armature whereby the voltage is switched off of the counting system which is returned to normal.

The relay N can be restored to normal by the switch O so that the alarm is switched off again. The counting system is interrupted too, so that when switching takes place during the operation of the counting system, the counting has to restart after switching.

When the counting system is in operation without having reached its final position, it will return to its normal position only when relay H releases its armature. This release can take place under the following circumstances:

(a) When the relay I is operative and the relay T not yet inoperative. Interruption will take place in the anode circuit of tube $V_{III}$ if the relay I releases its armature so that relay H becomes inoperative;

(b) When the relay T has released its armature and the relay I is yet operative after two seconds. The anode current in tube $V_{III}$ will become zero because $C_4$ and $C_5$ are charged so that relay H releases its armature;

(c) When the relay T has released its armature and relay I has not yet become operative after two seconds. Condenser $C_3$ will have become charged so that the relay H releases its armature.

The contact 3 of relay T has been provided to prevent that if relay I becomes inoperative within three seconds, the counting system makes a step before being reset to its initial position. At the third dash, this would result in the operation of the alarm relay N.

Figure 3:
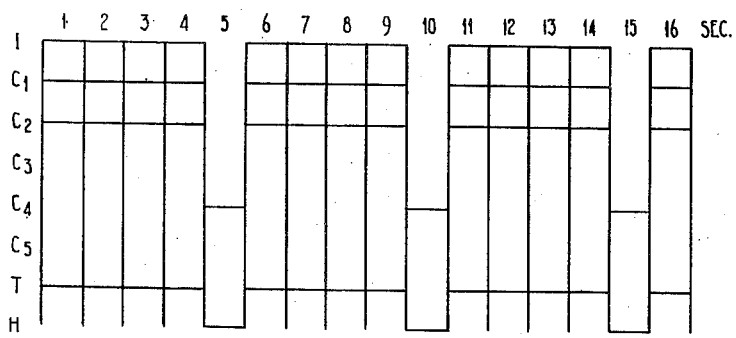

The transmission of distress signals is carried out in the following manner (see Figs. 1 and 3):

For the transmission, the switch S is switched over which has the following results:

(a) The radio transmitter is now under the control of relay H at contact 1 as the switch S is switched and closes at contact 1 the circuit for the transmitter. (b) The input relay I is now disconnected from the radio receiver at contact 2 of switch S by means of which relay I is now switched to contact 2 of relay H and controlled thereby. (c) The charging time check of tube $V_I$ changes from three to four seconds, as the contact 5 of the inverted switch S brings condenser $C_1$ parallel to the condenser $C_2$, the possible anode path over contact 1 of relay T being interrupted. (d) The charging time check of tube $V_{III}$ being changed from two to one second by switching of condenser $C_5$ in the parallel network consisting of condensers $C_4$ and $C_5$ and resistors $R_4$ and $R_5$ by means of contact 4 of switch S, by means of contact 3 of switch S a short-circuit for condenser $C_3$ is provided so that no series of condensers will exist and reduce the set checking time, whereas said contact 3 of said switch also functions for completing a charging path for condenser $C_4$.

When switch S is switched over during the reception of signals the following possibilities occur.

(1) Switch S is switched over during the reception of a dash which did not yet last three seconds so that relays I, T and H are energized.

(2) Switch S is switched over during the reception of a dash which already lasted three seconds and not yet five seconds so that relays I and H are operated.

(3) Switch S is switched over during the reception of a dash which exceeds five seconds so that only relay I is operated.

(4) Switch S is switched over during an interspace of less than two seconds, thus relay H is operated after a dash of more than minimum duration.

(5) Switch S is switched over during an interspace exceeding the maximum duration so that none of the relays I, T and H are energized.

In the first case contact 1 of relay I will take its back side as the circuit for relay I is interrupted at contact 2 of switch S. The condensers $C_1$ and $C_2$ in the anode circuit are now short-circuited over contact 5 of switch S, contact 1 of relay I, resistor $R_2$ and resistor $R_1$. The anode current of tube $V_I$ is interrupted as no circuit is to be found so that the screen voltage will increase so much that relay T is de-energized Upon switching over of contact 2 of relay T and contact 2 of relay I in the anode circuit of tube $V_{III}$ no charging or other circuit is to be found for the anode current of tube $V_{III}$ so that relay H is released. It should be remarked that the circuits over contacts 3 and 4 of switch S are interrupted as said switch is switched over. As relay H is released a circuit will be closed over its contact 2 for relay I which runs from battery Bat 1 over relay I, contact 2 of the inverted switch S, back contact 2 of relay H to ground. The release of relay H has on the other hand the effect that the counting arrangement is restored to its initial condition.

In the second case in which the condensers $C_4$ and $C_5$ are being charged the switching over of the switch S results in de-energizing relay I so that the condensers $C_1$ and $C_2$ are now parallel in the anode circuit of tube $V_I$ and short-circuited relay T remains de-energized. As explained already with reference to the first case no circuit is to be found for the anode current in tube $V_{III}$ so that relay H is released.

In the third case the condensers $C_2$, $C_4$ and $C_5$ are charged and relays T and H released. Opening of contact 2 of switch S results in the release of relay I as stated above so that by means of contact 1 a short-circuit discharges the condenser $C_2$. Upon reaching the other side of contact 2 of switch S the relay I will be energized again introducing the possibility of charging the condensers $C_1$ and $C_2$ owing to which relay T is operated. The charging time may in this case be shorter than usual as condenser $C_2$ might not be entirely discharged. Relay T will however operate at least one second, according to the charging time of condenser $C_1$. By means of front contact 2 of relay T the condenser $C_4$ will be discharged.

In the fourth case the condenser $C_3$ is being charged whereas relay H is operated. The condensers $C_2$, $C_4$ and $C_5$ are thus discharged. Opening the anode circuit of tube $V_{III}$ to the condenser $C_3$ interrupts the anode current so that relay H is de-energized. By means of contact 2 of relay H and contact 2 of switch S a circuit is now made for relay I which is energized.

In the fifth case the condenser $C_3$ is charged and the condensers $C_2$, $C_4$ and $C_5$ are discharged, relay H being released. Upon switching over switch S the circuit for relay I is immediately made and the transmission of distress signals started.

In the five above cases the moment of energizing relay I is reached. When relay I is energized contacts 1 and 2 are switched over in the anode circuits of tubes $V_I$ and $V_{III}$, respectively. The contact 2, however, has not the slightest effect as contact 3 of switch S is inverted. Contact 1 on the other hand closes a charging path for the condensers $C_1$ and $C_2$ which condensers are then charged in four seconds, operating relay T during the charging. Relay H, however, is not energized as the condenser $C_4$ which might be charged is short-circuited by contact 2 of relay T. After four seconds, however, relay T will be de-energized so that the tube $V_{III}$ can pass a charging current to condenser $C_4$, the current path running from battery HTB over contact 3 of switch S, contact 2 of relay T to condenser $C_4$. The condenser $C_4$ has only a charging time of one second so that relay H will only be operated during one second, after which it is released again, thus closing the circuit for relay I once more at contact 2.

It will be clear now that an uninterrupted series of dashes and spaces of four and one second length, respectively, is transmitted by said relay H. The transmitter is now operated by means of contact 1 of relay H the circuit of which has been described above.

It will be understood that each of the elements described above, or two or more together, may also find a useful application in other types of devices for closing alarm circuits, differing from the types described above.

While I have illustrated and described the invention as embodied in alarm circuits, I do not intend to be limited to the details shown, since various modifications and structural changes may be made without departing in any way from the spirit of my invention.

Without further analysis, the foregoing will so fully reveal the gist of my invention, that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A timing circuit arrangement for checking the minimum duration of dashes forming part of a distress signal comprising in combination: a pentode having a screen grid circuit including a screen grid, and an anode circuit; means for closing said anode circuit of said pentode upon receipt of a distress signal so as to change the current in said screen grid circuit in opposition to the current in said anode circuit; a condenser in said anode circuit of said pentode, the charging time of said condenser being adjusted to the minimum duration of a dash; means for biasing said screen grid of said pentode to a predetermined voltage; and a tube having a control grid connected to said screen grid of said pentode so as to be responsive to said current in said screen grid circuit.

2. A timing circuit arrangement for checking the minimum duration of dashes forming part of a distress signal comprising in combination: a pentode having a cathode, a control grid, a screen grid circuit including a screen grid, and an anode circuit; a resistance connected in series with said cathode of said pentode; means for biasing said control grid of said pentode to a predetermined voltage; means for closing said anode circuit of said pentode upon receipt of a distress signal so as to change the current in said screen grid circuit in opposition to the current in said anode circuit; a condenser in said anode circuit of said pentode, the charging time of said condenser being adjusted to the minimum duration of a dash; means for biasing said screen grid of said pentode to a predetermined voltage; and a tube having a control grid connected to said screen grid of said pentode so as to be responsive to said current in said screen grid circuit.

3. A timing circuit arrangement for checking the minimum and maximum durations of dashes, and the maximum duration of interspaces, forming part of a distress signal comprising in combination: a first pentode and a second pentode both having a screen grid and an anode circuit; a condenser in said anode circuit of said first pentode, the charging time of said condenser in said anode circuit of said first pentode being adjusted to the minimum duration of a dash; two circuits including each a condenser and connected in said anode circuit of said second pentode, said circuits being adjusted for measurement of the maximum duration of the dashes and interspaces, respectively; means for biasing said screen grids of said pentodes each to a predetermined voltage; means for decreasing the anode current and thus increasing the screen grid current of each of said pentodes; and a first tube and a second tube each having a control grid, said control grid of said first and said second tube being connected, respectively, to said screen grid of said first and said second pentode.

4. A timing circuit arrangement for checking the minimum and maximum durations of dashes, and the maximum duration of interspaces, forming part of a distress signal comprising in combination: a first pentode and a second pentode both having a cathode, a control grid, a screen grid and an anode circuit; a resistance connected in series with each of said cathodes of said pentodes; means for biasing each of said control grids of said pentodes to a predetermined voltage, respectively; a condenser in said anode circuit of said first pentode, the charging time of said condenser in said anode circuit of said first pentode being adjusted to the minimum duration of a dash; two circuits including each a condenser and connected in said anode circuit of said second pentode, said circuits being adjusted for measurement of the maximum duration of the dashes and interspaces, respectively; means for biasing said screen grids of said pentodes each to a predetermined voltage; means for decreasing the anode current and thus increasing the screen grid current of each of said pentodes with decreasing anode currents in said pentodes; a first tube and a second tube each having a control grid, said control grid of said first and said second tube being connected, respectively, to said screen grid of said first and said second pentode.

5. A timing circuit comprising in combination, a pentode having a screen grid circuit and an anode circuit having a current source; means for closing said anode circuit; a condenser, said condenser being alternately inserted in said anode circuit and short-circuited by said closing means so as to be charged by said current source and discharged; and means responsive to a change of current in said screen grid circuit upon operation of said means for closing said anode circuit.

6. A timing circuit comprising in combination, a pentode having a screen grid circuit and an anode circuit having a current source; means for closing said anode circuit; and a condenser, said condenser being alternately inserted in said anode circuit and short-circuited by said closing means; the current in said screen grid circuit being increased with decreasing anode current, the charging time of said condenser being adjusted for timing the increase of said current in said screen grid current.

7. A timing circuit comprising in combination, a pentode having a screen grid circuit, an anode circuit having a current source, and a cathode circuit; a resistance in said cathode circuit; means for closing said anode circuit; a condenser, said condenser being alternately inserted in said anode circuit and short-circuited by said closing means so as to be charged by said current source and discharged; the charging time of said condenser being adjusted for timing the increase of said current in said screen grid circuit; and means responsive to the increase of said current in said screen grid circuit.

8. A timing circuit comprising in combination, a pentode having a screen grid circuit including a screen grid, and an anode circuit having a current source; means for closing said anode circuit of said pentode; a condenser, said condenser being alternately inserted in said anode circuit and short-circuited by said closing means so as to be charged by said current source and discharged; means for biasing said screen grid of said pentode to a predetermined voltage; a tube having an anode circuit and a control grid connected to said screen grid of said pentode; and means responsive to the current in said anode circuit of said tube, the charging time of said condenser in said anode circuit of said pentode being adjusted for timing the increase of said current in said screen grid circuit.

9. A timing circuit arrangement for checking maximum durations of dashes and the maximum duration of interspaces forming part of a distress signal comprising in combination, a pentode having a screen grid and an anode circuit; two circuits including each a condenser and connected in said anode circuit of said pentode; said circuits being adjusted for measurement of the maximum duration of the dashes and interspaces, respectively; means for biasing said screen grid of said pentode to a predetermined voltage; means for decreasing the anode current and thus increasing the screen grid current of said pentode; and a tube having a control grid, said control grid of said tube being connected to said screen grid of said pentode.

10. A timing circuit arrangement for checking the maximum durations of dashes and the maximum duration of interspaces forming part of a distress signal comprising in combination, a pentode having a cathode, a control grid, a screen grid and an anode circuit; a resistance connected in series with said cathode of said pentode; means for biasing said control grid of said pentode to a predetermined voltage; two circuits including each a condenser and connected in said anode circuit of said pentode, said circuits being adjusted for measurement of the maximum duration of the dashes and interspaces, respectively; means for biasing said screen grid of said pentode to a predetermined voltage; means for decreasing the anode current and thus increasing the screen grid current of said pentode; and a tube having a control grid, said control grid of said tube being connected, to said screen grid pentode.

11. A timing circuit, comprising in combination, a tube having an anode circuit; a condenser; switching means for inserting said condenser in said anode circuit; said switching means for changing the current in said anode circuit of said tube; and means responsive to a change of said current in said anode circuit of said tube.

12. A timing circuit, comprising in combination, a tube having an anode circuit; a condenser in said anode circuit; switching means for inserting said condenser in said anode circuit and for short-circuiting said condenser so as to charge and discharge said condenser, respectively; and means responsive to the charging and discharging of said condenser.

13. A timing circuit comprising in combination, a pentode having a screen grid circuit including a screen grid, and an anode circuit; switching means for closing said anode circuit; a condenser in said anode circuit of said pentode, said condenser being alternately inserted in said anode circuit and short-circuited by said switching means, said switching means changing the current in said screen grid circuit of said pentode with a change of the current in said anode circuit of said pentode and in opposition thereto; and means responsive to a change of said current in said screen grid circuit of said pentode.

14. A timing circuit, comprising in combination, a pentode having a screen grid circuit and an anode circuit including a current source; a condenser; switching means for alternately inserting said condenser in said anode circuit and short-circuiting said condenser, respectively, so as to charge said condenser by said current source and discharge said condenser, respectively, said switching means changing the current in said screen grid circuit of said pentode with, and in opposition to, a change of the current in said anode circuit of said pentode, the charging time of said condenser being adjusted for timing the change of said current in said screen grid circuit of said pentode.

BERNARDUS P. J. van BERKEL.

REFERENCES CITED

The following references are of record in the file of this patent:

UNITED STATES PATENTS

| Number | Name | Date |
|---|---|---|
| 1,552,321 | Lea | Sept. 1, 1925 |
| 1,634,979 | Carter | July 5, 1927 |
| 1,726,163 | Powell | Aug. 27, 1929 |
| 1,970,455 | Humphries | Aug. 14, 1934 |
| 2,083,849 | Litstrom | June 15, 1937 |
| 2,094,733 | Byrnes | Oct. 5, 1937 |
| 2,277,579 | Burger | Mar. 24, 1942 |
| 2,329,048 | Hullegard | Sept. 7, 1943 |
| 2,428,592 | Stadum | Oct. 7, 1947 |
| 2,549,769 | Bray et al. | Apr. 24, 1951 |

FOREIGN PATENTS

| Number | Country | Date |
|---|---|---|
| 339,265 | Great Britain | Dec. 3, 1930 |